AUTOMATIC FREQUENCY CONTROL FOR FREQUENCY MODULATED GENERATORS

Filed Nov. 15, 1952 2 Sheets-Sheet 1

INVENTOR.
BEN WARRINER IV

BY H. A. Mackey
ATTORNEY

Jan. 22, 1957 B. WARRINER IV 2,778,999

AUTOMATIC FREQUENCY CONTROL FOR FREQUENCY MODULATED GENERATORS

Filed Nov. 15, 1952 2 Sheets-Sheet 2

INVENTOR.
BEN WARRINER IV

BY H. L. Maskey

ATTORNEY

United States Patent Office 2,778,999

Patented Jan. 22, 1957

2,778,999

AUTOMATIC FREQUENCY CONTROL FOR FREQUENCY MODULATED GENERATORS

Ben Warriner IV, Ithaca, N. Y., assignor to General Precision Laboratory Incorporated, a corporation of New York Application November 15, 1952, Serial No. 320,636

2 Claims. (Cl. 332—19)

This invention relates to an arrangement for automatically controlling the carrier frequency of high frequency generators which are frequency or phase modulated. More specifically the invention concerns a system for controlling the carrier frequency of asymmetrically modulated generators.

This invention is especially applicable to radio transmitters. For example, magnetron oscillators in the 5000 mc. p. s. range which are symmetrically frequency modulated may be automatically controlled in frequency by the means disclosed in Patent No. 2,709,786 issued May 31, 1955 to the same inventor. However, if the frequency modulation of the generator is asymmetric, such an arrangement operates to adjust the generator on the basis of the time average frequency rather than to the carrier frequency. The present invention constitutes an improvement on the invention of patent application referred to above in that the carrier frequency of the generator is controlled even when the modulation is asymmetric.

The instant invention is also applicable to telemetering transmitters employing pulse frequency modulation, and to short-range pick-up television transmitters using frequency modulation, to stabilize the no-signal frequency. The invention is also applicable to continuous wave radio telegraph transmitters using one frequency for spacing signals and another frequency for marking signals.

In all of these applications the transmitter carrier frequency is modulated by being either increased or decreased, but in any particular transmitter all modulation is of one sense only. In such transmitters the time average frequency during modulation is different from the carrier frequency and varies with the modulation. Since all frequency discriminators give an output based on the time average of frequency, they are useless in maintaining constant carrier frequency in such transmitters.

The present invention, on the other hand, when employed in such a transmitter, gives an output that indicates deviation of the carrier frequency from a selected frequency standard, and is not affected by the amount of modulation. The invention includes a comparator circuit receiving one input from a discriminator containing the pulse modulation and the frequency deviation and also receives a second input from the pulse modulator containing the pulse modulation only. The comparator circuit compares these two input signals and subtracts them, leaving only the frequency deviation, which is then used to control the carrier frequency.

One purpose then of this invention is to provide an automatic frequency control circuit to maintain constant the carrier frequency of a pulsed frequency modulated generator.

A more specific purpose of this invention is to provide a circuit for maintenance of the constancy of the carrier frequency of a frequency modulated radio transmitter, the modulation of which is not symmetrical about the carrier frequency.

Another purpose of this invention is to provide a comparator for use in conjunction with a discriminator and frequency modulated generator to produce a signal suitable for control of the generator basic frequency under all conditions of modulation.

A further understanding of this invention may be secured from the detailed description and drawings, in which:

Figure 1 is a schematic diagram illustrating one use of the invention.

Figure 2 schematically illustrates the electrical connections of several components of Fig. 1.

Figure 1:
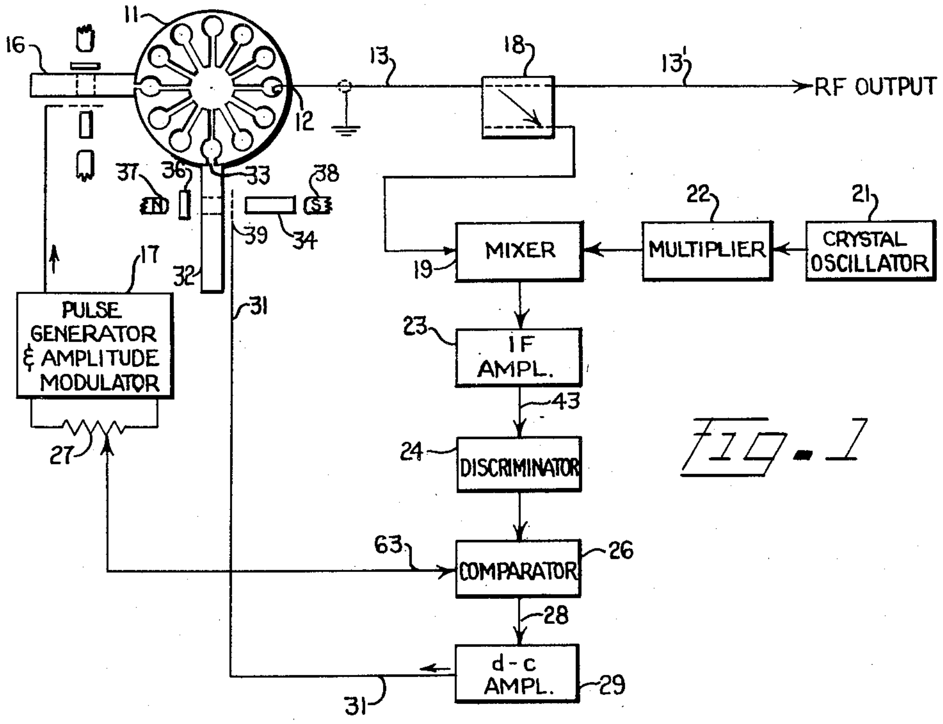

Referring now to Fig. 1, a 12-cavity magnetron 11 generates microwave energy having a frequency of 6000 mc. p. s. termed the carrier frequency. This energy is coupled out of the magnetron at 12 and is conducted to its load through suitable microwave conductors 13 and 13'. The magnetron is pulse modulated by a modulator 17. This represents any desired means such as an automatic telegraph transmitter, a telemeter code transmitter or a television camera generating video signals. These pulse signals may be applied to frequency modulate the magnetron by any means as, for example, by the means described in the previously mentioned application and shown in Fig. 1 by the parallel plate structure 16 and associated components. Thus the applied pulse or video amplitude modulation is converted into frequency modulation at the magnetron having a frequency variation always in the same sense relative to the unmodulated magnetron frequency, also variously termed the interpulse, spacing, or black level frequency.

A small amount of the magnetron's output energy is taken off through a directional coupler 18 and applied to a microwave mixer 19. A crystal oscillator 21 cut to oscillate at 55 mc. p. s. is connected to a multiplier 22, where its frequency is multiplied 18 times in triodes to 990 mc. p. s., then is multiplied by means of klystron tubes to a final frequency of 5940 mc. p. s. The output signal is applied to the mixer 19 and the difference frequency of 60 mc. p. s. is applied to an intermediate frequency amplifier 23. This amplifier is conventional and is broadband so that it will pass all frequencies resulting from frequency modulation of the magnetron. For example, let it be supposed that the modulation is in such sense and produces such deviation as to reduce the difference frequency by 4 mc. p. s.

The amplifier output is applied to a discriminator 24 and its output in the form of a pulse, or video modulated direct current signal is applied to a comparator 26. To this comparator 26 there also is applied the pulse or video signal as generated at 17, suitably controlled in magnitude by the voltage divider 27. The comparator output at 28 consists of the difference of the two inputs, and includes a direct current signal representing any error or deviation of the carrier frequency from its normal value. The pulse inputs cancel each other so that their difference is zero when the voltage divider 27 is properly adjusted, leaving only the carrier error signal. This signal is amplified by an amplifier 29 and is applied through conductor 31 to the magnetron frequency control device described in the previously referred-to application and briefly described as follows:

A pair of parallel plates 32 are connected through an iris opening 33 to one of the magnetron cavities. These plates are connected together at both ends and have a length equal to one-half wavelength at the magnetron operating frequency. Resonant oscillations are set up in this parallel plate structure by the magnetron 11. An electron gun 34 generates electrons which are attracted to an anode 36, passing through the space between the parallel plates, and a magnet represented by the poles 37 and 38 applies a unidirectional magnetic field along the axis of the electron stream, which under these conditions takes a spiral path. The structure can be made to present a reactive load to the magnetron by proper adjustment of the magnetic field. A control grid 39, controls the beam current and thereby controls the magnitude of the reactance presented by the parallel plate structure 32, which in turn varies the frequency of oscillation of the magnetron. Since the conductor 31 is connected to the control grid 39, the magnetron is controlled in carrier frequency only by the carrier error signal.

Figure 2:
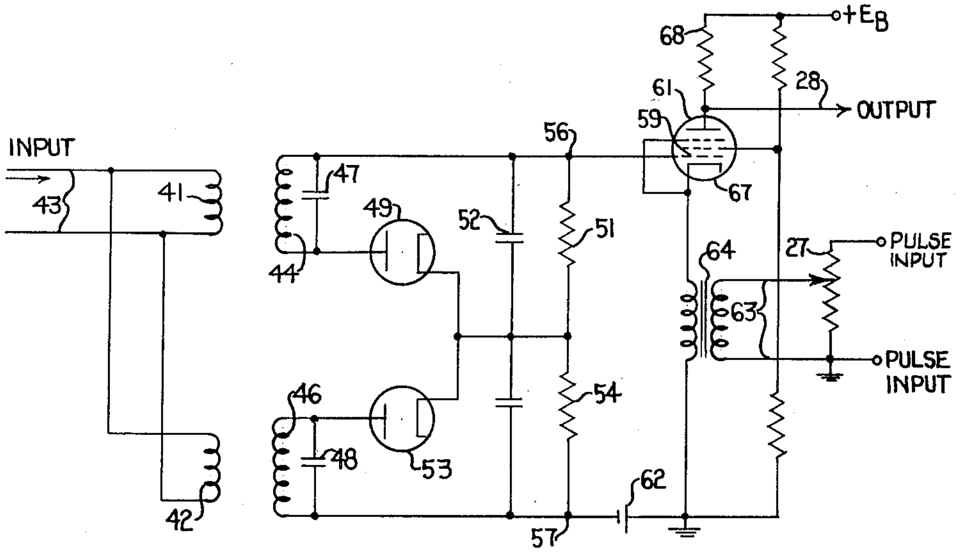

The discriminator 24 and comparator 26 are more fully shown in Fig. 2. The discriminator contains two transformers having primary windings 41 and 42 energized through conductors 43 by the output of the intermediate amplifier 23. The secondary windings 44 and 46 are tuned by condensers 47 and 48 to frequencies above and below the carrier frequency, the crossover frequency of the resonant circuit being exactly that of the normal carrier. This crossover frequency of these circuits constitutes the frequency standard to which the carrier frequency is held.

Figure 3:
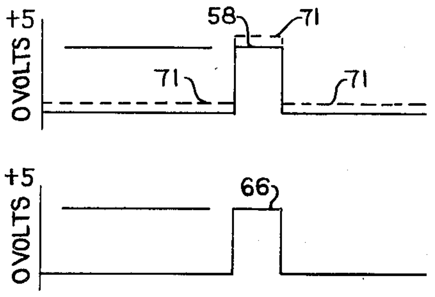
Figure 3 depicts wave forms illustrating the operation of the invention.

The output of the resonant circuit 44, 47 is rectified in diode 49 to produce a proportional direct voltage across resistor 51, being smoothed by condenser 52, another direct voltage being similarly generated through the medium of the resonant circuit 46, 48 and diode 53 and imposed across resistor 54. Since all frequency modulation of the magnetron is always in the same sense, the relative polarization of the junctions 56 and 57 is always in the same sense. For example, let it be supposed that when the carrier is on frequency the interpulse potential difference between junctions 56 and 57 is zero, and the pulse potential of junction 56 is +5 volts relative to junction 57. This pulse potential is indicated in Fig. 3 at 58, and is applied to the control grid 59 of a pentode 61, the magnitude of the fixed bias battery 62 being disregarded in pulse voltage calculations.

The input from the pulse generator is applied from voltage divider 27, Figs. 1 and 2, through conductors 63 to a transformer 64, the secondary of which is connected in the cathode circuit of tube 61. Polarity and magnitude of the pulse input are so arranged that the cathode is raised in voltage at the same time that the grid voltage is raised and by the same amount. This cathode input is indicated in Fig. 3 at 66.

The plate current then is substantially unchanged, as is indicated by the equation $$i_p=\frac{E_B+\mu e_g-(\mu+1)e_k}{r_p+R_p} \qquad (1)$$

in which $i_p$ is the pentode plate current, $E_B$ is the supply potential, $\mu$ is the tube amplification constant, $e_g$ is the signal voltage applied to the grid 59, $e_k$ is the signal voltage applied to the cathode 67, $r_p$ is the internal tube resistance and $R_p$ is the resistance of the plate resistor 68. The output potential change at conductor 28 is a function of changes in $i_p$. That is to say, that the plate output is proportional to the difference between the grid and cathode input signals, so that if they vary alike there is no output whatever. This is true as shown by Equation 1 when $\mu$ is infinite and it is practically so when a high $\mu$ pentode is employed.

If the carrier frequency should depart from its assigned value in either direction, a positive or negative error voltage approximately proportional to such departure will be added to the voltage applied to the grid 59. This added carrier error voltage will exist both during pulses and during the interpulse time, as is indicated by the dashed line 71 in Fig. 3. Since it is not compensated for by any concurrent change in cathode voltage, this added voltage appears as an amplified potential at the output 28. This potential is further amplified by the direct current amplifier 29, Fig. 1, and is applied to the magnetron as before described in such sense as to correct the frequency error of its carrier. In this way the carrier frequency is automatically maintained constant.

Figure 4:
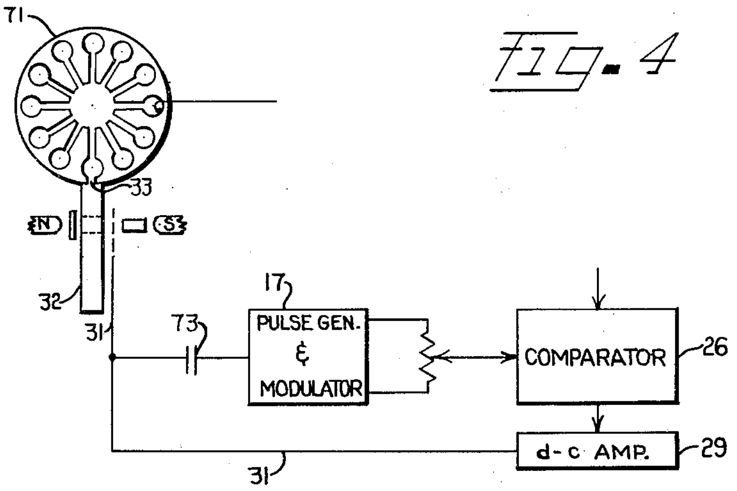
Figure 4 is a schematic diagram of another embodiment of the invention.

In place of the magnetron circuit of Fig. 1 employing two reactive elements for frequency control and modulation of the magnetron, a simpler circuit employing but one reactive element can be employed when the modulation is of the normal pulse or video type. This circuit is indicated in Fig. 4, in which the parallel plate structure 32 is secured to the magnetron 71 and is connected therewith by the iris opening 33. The comparator 26 and direct-coupled amplifier 29 are connected to the parallel plate structure through conductor 31 and grid 39 as explained in connection with Fig. 1, and have the same function of automatically maintaining constancy of carrier frequency. The pulse generator and amplitude modulator 17, however, instead of requiring use of a second parallel plate structure, is connected through condenser 73 and the conductor 31 to the control grid 39. Thus the pulse modulations and the frequency control signals are added and both are effective in controlling the magnetron through the single parallel plate frequency modulation structure.

It is obvious that the several components shown and described are not unique but have numerous equivalents. For example, the invention is not confined to the control of magnetrons, but can as well be applied to other microwave generators such as the klystron. The discriminator described in connection with Fig. 2 is but one of a large class, any one of which may be substituted with success for that described. For the comparator comprising pentode 61, Fig. 2, there can be substituted any of several other comparators, and in general any direct-coupled differential amplifier can be used instead of the comparator described. In place of the microwave mixer and wire circuit discriminator a microwave discriminator may be employed or, in general, there may be substituted any circuit for securing a discriminator output signal representative of the generator radio frequency output.

What is claimed is:

1. An automatic frequency control for a frequency-modulated microwave generator comprising, a modulation signal generator producing a modulation signal, means for frequency modulating the carrier signal of said microwave generator by said modulation signal to produce a frequency-modulated output signal, a fixed frequency oscillator, mixing means having impressed thereon a portion of said frequency-modulated output signal and a signal derived from said fixed frequency oscillator producing therefrom a difference signal, a discriminator having said difference signal impressed thereon and producing therefrom an output signal whose amplitude varies in proportion to the frequency variation of said difference signal, subtracting means having impressed thereon the output signal of said discriminator and said modulation signal producing therefrom a direct current signal whose amplitude is proportional to the difference of said discriminator output signal and said modulation signal, and means for applying said direct current signal to said microwave generator to maintain the unmodulated signal thereof at a constant frequency.

2. An automatic frequency control for a frequency-modulated microwave generator operating at a preselected carrier signal frequency comprising, a modulation signal generator producing a modulation signal, means for frequency modulating said carrier signal by said modulation signal to produce a frequency-modulated output signal, a fixed frequency oscillator, mixing means having impressed thereon a portion of said frequency-modulated output signal and a signal derived from said fixed frequency oscillator producing therefrom a difference signal, a discriminator having said difference signal impressed thereon and producing therefrom an output signal whose amplitude varies in proportion to the frequency variation of said difference signal, subtracting means having impressed thereon the output signal of said discriminator and said modulation signal producing therefrom a direct current signal whose amplitude is proportional to the difference of said discriminator output signal and said modulation signal, means for adjusting the relative amplitude of the discriminator output signal and the modulation signal impressed on said subtracting means so that at the preselected carrier signal frequency no direct current signal is produced, and means for applying said direct current signal to said microwave generator to maintain the unmodulated signal thereof at a constant frequency.

References Cited in the file of this patent

UNITED STATES PATENTS

| | | |
|---|---|---|
| 2,456,763 | Ziegler | Dec. 21, 1948 |
| 2,475,779 | Crosby | July 12, 1949 |
| 2,590,784 | Moulton | Mar. 25, 1952 |
| 2,653,243 | McClellan | Sept. 22, 1953 |
| 2,692,947 | Spencer | Oct. 26, 1954 |
| 2,693,528 | Hollingsworth | Nov. 2, 1954 |